United States Patent
Kim et al.

(10) Patent No.: US 8,587,561 B2
(45) Date of Patent: Nov. 19, 2013

(54) MULTI-SENSING TOUCH PANEL AND DISPLAY APPARATUS USING THE SAME

(75) Inventors: Woon-bae Kim, Suwon-si (KR); Jong-oh Kwon, Suwon-si (KR); Seung-wan Lee, Suwon-si (KR); Du-sik Park, Suwon-si (KR); Min-seog Choi, Seoul (KR); Chang-kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 739 days.

(21) Appl. No.: 12/688,494

(22) Filed: Jan. 15, 2010

(65) Prior Publication Data

US 2010/0283763 A1      Nov. 11, 2010

(30) Foreign Application Priority Data

May 8, 2009 (KR) .................. 10-2009-0040324

(51) Int. Cl.
*G06F 3/042* (2006.01)
(52) U.S. Cl.
USPC .......................................... 345/175; 345/173
(58) Field of Classification Search
USPC .................. 345/173–175; 178/18.01–18.07
See application file for complete search history.

(56) References Cited

U.S. PATENT DOCUMENTS

| 4,340,300 | A | | 7/1982 | Ruell |
| 6,061,177 | A | * | 5/2000 | Fujimoto ........................ 359/443 |
| 6,327,459 | B2 | * | 12/2001 | Redford et al. ............ 434/307 R |
| 6,504,143 | B2 | * | 1/2003 | Koops et al. .................. 250/221 |
| 6,803,906 | B1 | * | 10/2004 | Morrison et al. ............. 345/173 |
| 7,176,905 | B2 | * | 2/2007 | Baharav et al. ............... 345/175 |
| 7,351,949 | B2 | * | 4/2008 | Oon et al. ..................... 250/221 |
| 7,656,393 | B2 | * | 2/2010 | King et al. .................... 345/173 |
| 7,714,265 | B2 | * | 5/2010 | Fadell et al. ............. 250/214 AL |
| 7,995,039 | B2 | * | 8/2011 | Eliasson et al. ............... 345/173 |
| 8,094,137 | B2 | * | 1/2012 | Morrison ...................... 345/175 |
| 2002/0075240 | A1 | * | 6/2002 | Lieberman et al. ........... 345/170 |
| 2003/0092470 | A1 | * | 5/2003 | Kurakane ...................... 455/566 |
| 2006/0086896 | A1 | | 4/2006 | Han |
| 2008/0179507 | A2 | | 7/2008 | Han |
| 2008/0180405 | A1 | | 7/2008 | Han et al. |
| 2008/0284925 | A1 | | 11/2008 | Han |
| 2009/0002344 | A1 | | 1/2009 | Wilson et al. |
| 2009/0103853 | A1 | * | 4/2009 | Daniel ............................ 385/13 |

FOREIGN PATENT DOCUMENTS

| JP | 2001-297669 A | 10/2001 |
| JP | 2006-162922 A | 6/2006 |
| JP | 200752817 A | 3/2007 |
| JP | 2007-122752 A | 5/2007 |
| KR | 10-2007-0011450 A | 1/2007 |
| KR | 10-2008-0028208 A | 3/2008 |

* cited by examiner

*Primary Examiner* — Ricardo L Osorio
(74) *Attorney, Agent, or Firm* — Sughrue Mion, PLLC

(57) ABSTRACT

A multi-sensing touch panel and a display apparatus using the same are provided. The multi-sensing touch panel includes: a touch pad including an input surface; at least one infrared ray source which irradiates infrared rays to the touch pad; and a camera array including a plurality of infrared ray cameras which are disposed below the touch pad and inclined with respect to a plane of the input surface.

23 Claims, 6 Drawing Sheets

MULTI-SENSING TOUCH PANEL AND DISPLAY APPARATUS USING THE SAME

CROSS-REFERENCE TO RELATED APPLICATION

This application claims priority from Korean Patent Application No. 10-2009-0040324, filed on May 8, 2009, in the Korean Intellectual Property Office, the disclosure of which is incorporated herein in its entirety by reference.

BACKGROUND

1. Field

One or more embodiments relate to a multi-sensing touch panel and a display apparatus using the same.

2. Description of the Related Art

A touch panel is a type of user interface that is installed in front of a display of an electronic device such as a computer, a notebook or a portable media player (PMP) and inputs a particular command or data to the electronic device by sensing a touch point contacted by a finger or pen.

As demand for user convenience increases, demand for touch panels is increasing greatly. Touch panels are widely used in broadcasting, education, medical video images, photos, music, moving pictures, virtual reality games, business to business (B2B) type electronic commerce or business to consumer (B2C) type electronic commerce.

Touch panels may be classified into optical touch panels, electrostatic capacity touch panels, ultrasonic wave touch panels, resistivity film touch panels, and electromagnetic induction touch panels according to the principle of driving the touch panels and according to uses thereof. For example, optical touch panels or electrostatic capacity touch panels may be used in large-sized displays, and resistivity film touch panels may be used in small-sized displays.

A touch panel is generally a one-point touch input device that is used instead of a mouse. Recently, as necessity for multi-input has increased, the development of multi-input technology has been accelerated.

SUMMARY

One or more embodiments provide a multi-sensing touch panel that senses input of two or more points and a display apparatus using the same.

According to an aspect of one or more embodiments, there is provided a touch panel including: a touch pad including an input surface to which a user's touch is input; at least one infrared ray source irradiating infrared rays to the touch pad; and a camera array including a plurality of infrared ray cameras disposed below the touch pad and slanted with respect to the input surface.

The camera array may be constituted by alternately arranging the plurality of infrared ray cameras slanted with respect to the input surface in opposite directions to each other. The touch panel may further include at least one mount including a first surface slanted with respect to the input surface at an angle θ and a second surface slanted with respect to the input surface at an angle −θ and disposed below the touch pad, wherein the plurality of infrared ray cameras are disposed on the first surface and the second surface.

The plurality of infrared ray cameras may include: first and second infrared ray cameras disposed below the position that corresponds to a position in which the first infrared ray camera and the second infrared ray camera are distanced from both ends of an edge of the input surface along a direction in parallel with the input surface; and a third infrared ray camera disposed below the position that corresponds to a position in which the third camera is distanced from a center of another edge of the input surface parallel to the edge of the input surface along a direction in parallel with the input surface.

The infrared ray source may be disposed below the touch pad. The infrared ray source is disposed between infrared ray cameras, which are slanted in opposite directions to each other, among the plurality of infrared ray cameras.

The infrared ray source may be disposed at a side of the touch pad so that the infrared rays incident on the touch pad are totally internally reflected from an inside of the touch pad and proceed.

According to another aspect of one or more exemplary embodiments, there is provided a display apparatus including: a display panel, which forms an image by modulating incident light and includes a display surface on which the image is displayed and to which a user's touch is input; at least one infrared ray source irradiating infrared rays to the display surface; and a camera array including a plurality of infrared ray cameras which are disposed below the display panel and slanted with respect to the display surface.

The camera array may have a structure of a camera array that is used in the multi-sensing touch panel.

The display panel may include a liquid crystal panel, and the display apparatus may further include a backlight unit providing light to the liquid crystal panel for forming an image.

The backlight unit may include a reflection plate and a plurality of light sources disposed on the reflection plate, and wherein the camera array including the plurality of infrared ray cameras is disposed on the reflection plate.

The infrared ray source may be disposed at a side of the transparent substrate formed on the liquid crystal panel or on the reflection plate.

The backlight unit may include a light source and a light guide plate, and the camera array may be disposed below the light guide plate.

BRIEF DESCRIPTION OF THE DRAWINGS

The above and/or other aspects will become apparent and more readily appreciated from the following description of the embodiments, taken in conjunction with the accompanying drawings of which.

DETAILED DESCRIPTION

Figure 1:
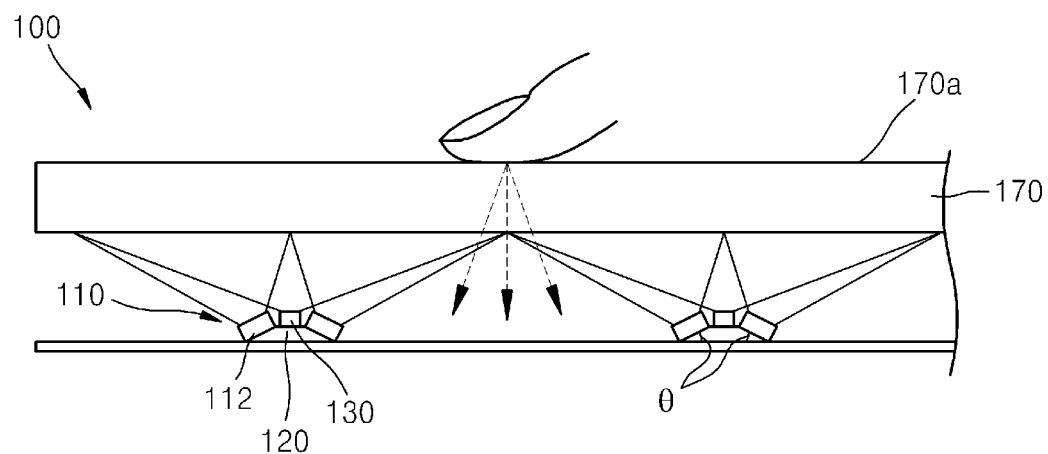
FIG. 1 is a cross-sectional view of a touch panel according to an embodiment.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

FIG. 1 is a cross-sectional view of a touch panel 100 according to an embodiment. Referring to FIG. 1, the touch panel 100 includes a touch pad 170 having an input surface 170a to which a user's touch is input, at least one infrared ray source 130 that irradiates infrared rays on the touch pad 170, and a camera array 110 including a plurality of infrared ray cameras 112, which are disposed below the touch pad 170 and inclined at an angle with respect to the input surface 170a.

The infrared ray source 130 may be disposed to irradiate infrared rays on the touch pad 170 and may be an infrared-ray light emitting diode (LED). The infrared ray source 130 may be disposed below the touch pad 170, and may be disposed between the infrared ray cameras 112, which are inclined in directions opposite to each other, for example. In this case, as illustrated in FIG. 1, the infrared ray source 130 may be disposed on a surface of a mount 120 that is parallel to the input surface 170a. The position of the infrared ray source 130 or the number of infrared ray sources 130 may be properly defined so that the infrared rays may be irradiated on a touch region, i.e., the input surface 170a to which a user's touch is input.

The camera array 110 includes the plurality of infrared ray cameras 112. The plurality of infrared ray cameras 112 capture an image near a point of the input surface 170a to which the user's touch is input, and sense ultraviolet rays that are scattered by the user's touch. Although a detailed structure of the infrared ray cameras 112 is not illustrated, the infrared ray cameras 112 may include an image capturing device such as a complementary metal-oxide semiconductor (CMOS) or a charge coupled device (CCD) that is formed of a material that is sensitive to the infrared rays, and a plurality of optical lenses.

According to an embodiment, the plurality of infrared ray cameras 112 of the camera array 110 are inclined at an angle with respect to a plane of the input surface 170a, so as to reduce the number of infrared ray cameras 112 covering the input surface 170a. The camera array 110 may be constituted by alternately arranging the plurality of infrared ray cameras 112 inclined with respect to the plane of the input surface 170a in directions opposite to each other. For example, as illustrated in FIG. 1, at least one mount 120 including a surface that is inclined with respect to the plane of the input surface 170a at an angle θ (about 0°<θ<about 90°) and a surface inclined with respect to the plane of the input surface 170a at an angle −θ, is disposed below the touch pad 170, and each of the plurality of infrared ray cameras 112 may be disposed on the surfaces of mount 120.

The infrared rays irradiated on the input surface 170a are scattered by the user's touch and are sensed by the infrared ray cameras 112 so that the point at which the user's touch is input may be determined. In this case, the number of infrared ray cameras 112 covering the touch region depends on a size of the touch pad 170. In further detail, the number of infrared ray cameras 112 depends on the size of the touch pad 170, the thickness of the touch panel 100, and a viewing angle of the infrared ray cameras 112. The number of infrared ray cameras 112 may be reduced by using wide-angle cameras having a large viewing angle. However, as the viewing angle of the infrared ray cameras 112 increases, image distortion increases nonlinearly. An additional lens may be used for correcting image distortion which may increase the thickness and the cost of the touch panel 100 increases. Image processing may also be performed so as to correct image distortion, however touch sensing speed may be reduced. Thus, there is a limit in reducing the number of infrared ray cameras 112 by increasing the viewing angle of the infrared ray cameras 112, and the camera array 110 inclined with respect to the input surface 170a will be described in the exemplary embodiments.

Figure 2:
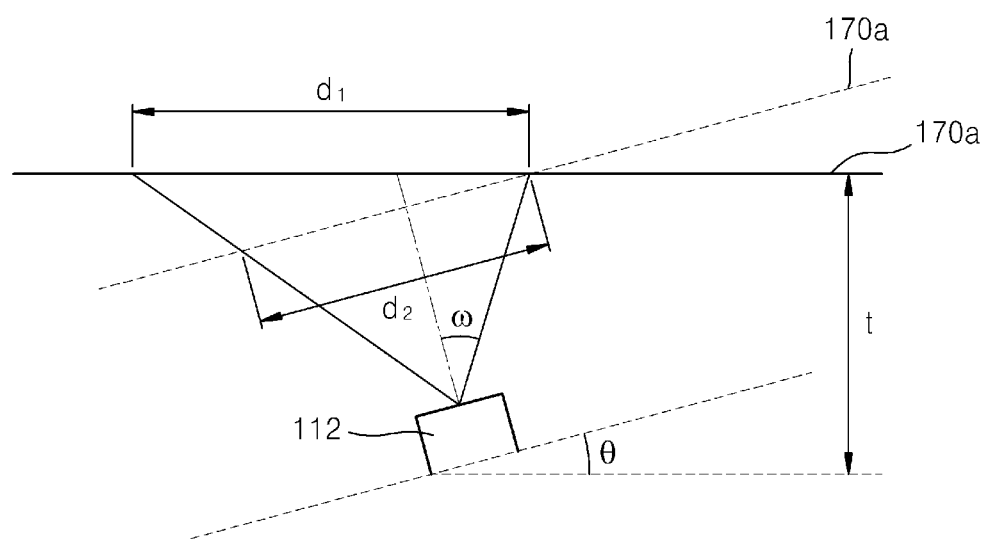
FIG. 2 illustrates a wide touch region that is covered by a camera slanted with respect to an input surface.

FIG. 2 illustrates a wide touch region that is covered by an infrared camera 112 inclined with respect to a plane of an input surface 170a. Referring to FIG. 2, when the infrared ray camera 112 having a half-viewing angle ω is inclined with respect to the plane of the input surface 170a at an angle θ, the length of the input surface 170a that is covered by the infrared ray camera 112 is $d_1$. In contrast to this, as indicated by dotted lines, when the input surface 170a and the infrared ray camera 112 are disposed to be parallel to each other, the length of the input surface 170a that is covered by the infrared ray camera 112 is $d_2$. $d_1$ is larger than $d_2$. Thus, when the infrared ray cameras 112 are inclined with respect to the input surface 170a, the number of infrared ray cameras 112 covering a touch region may be less than the number of infrared ray cameras 112 covering the touch region having the same size when the infrared ray cameras 112 are parallel to the input surface 170a. As the number of the infrared ray cameras 112 is reduced, the thickness t of the touch panel 100 decreases.

Figure 3:
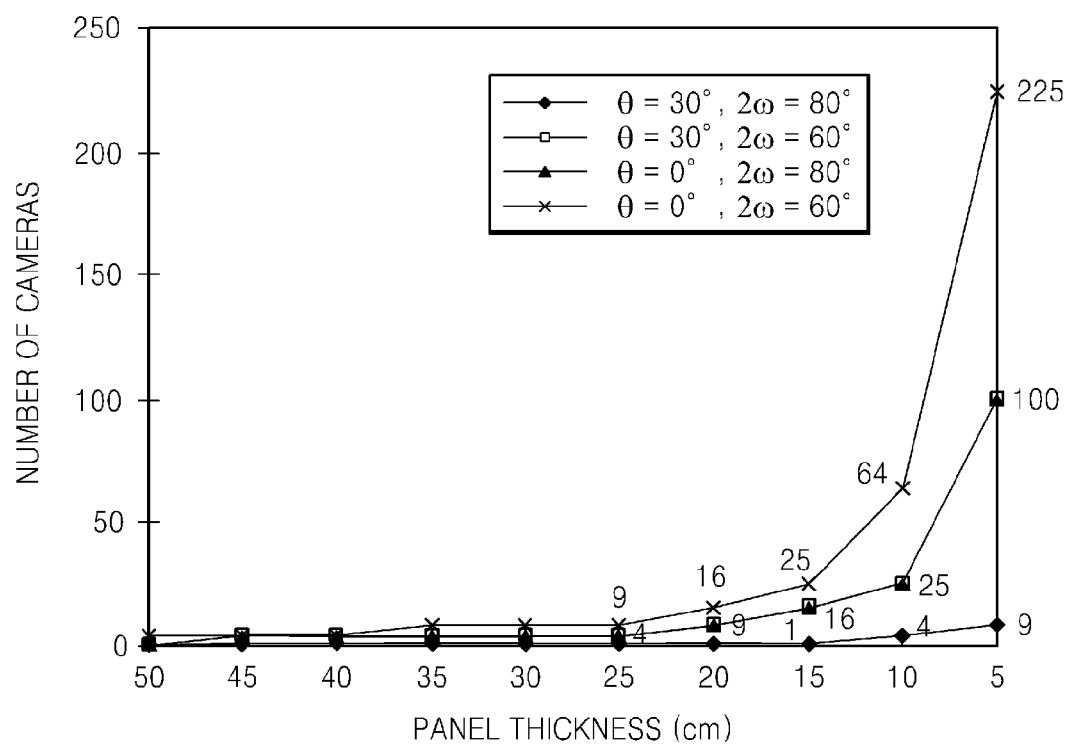
FIG. 3 is a graph of simulation showing the number of cameras covering a touch region according to a viewing angle of a camera, a slanted angle, and the thickness of a panel.

FIG. 3 is a graph of simulation showing the number of cameras covering a 32-inch long touch region according to a viewing angle 2ω of a camera, a slanted angle θ, and the thickness of the touch panel 100. Referring to FIG. 3, there is no large difference in the number of infrared ray cameras 112 in a region in which the touch panel 100 is formed to a large thickness, but as the thickness of the touch panel 100 decreases, the number of infrared ray cameras 112 varies greatly. When the thickness of the touch panel 100 is 5 cm and θ is 30° and 2ω is 80°, the number of infrared ray cameras 112 is reduced greatly to 9. Referring to FIG. 3, the number of infrared ray cameras 112 may be reduced by increasing the angle θ.

Figure 4:
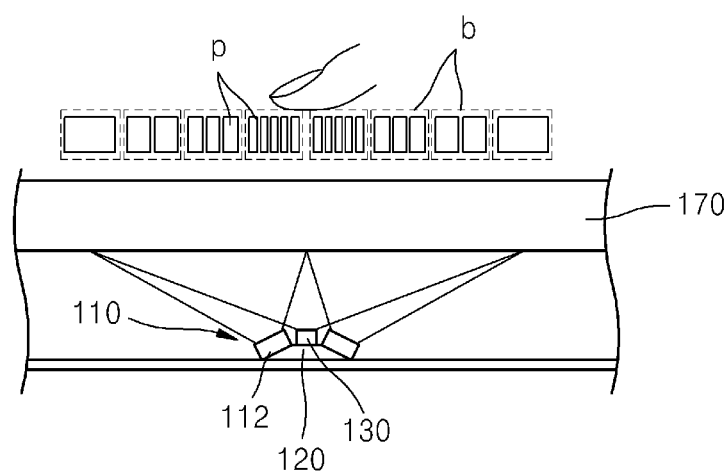
FIG. 4 illustrates variation of resolution according to a distance between a touch point and a camera.

When the number of infrared ray cameras 112 is reduced in the above manner, resolution of the infrared ray cameras 112 varies according to a distance between a touch point and one of the infrared ray cameras 112. FIG. 4 illustrates variation of resolution according to a distance between a touch point and a camera. An image of the touch point that is close to the infrared ray camera 112 includes a larger number of pixels p than that of a touch point that is further away from the infrared ray camera 112. However, the user's touch may be sensed with a resolution of about several mm. Thus, when many pixels are unnecessarily concentrated on the touch point having the same size, image processing may be delayed. Thus, referring to FIG. 4, when the size of the touch point is defined as blocks and image processing is performed in units of block b, a touch sensing time is reduced. Here, touch is performed by a user's finger, but the embodiments are not limited thereto, and when a tool such as a pen is used, the size of the touch point to be defined as blocks may be determined in consideration of the tool.

Figure 5:
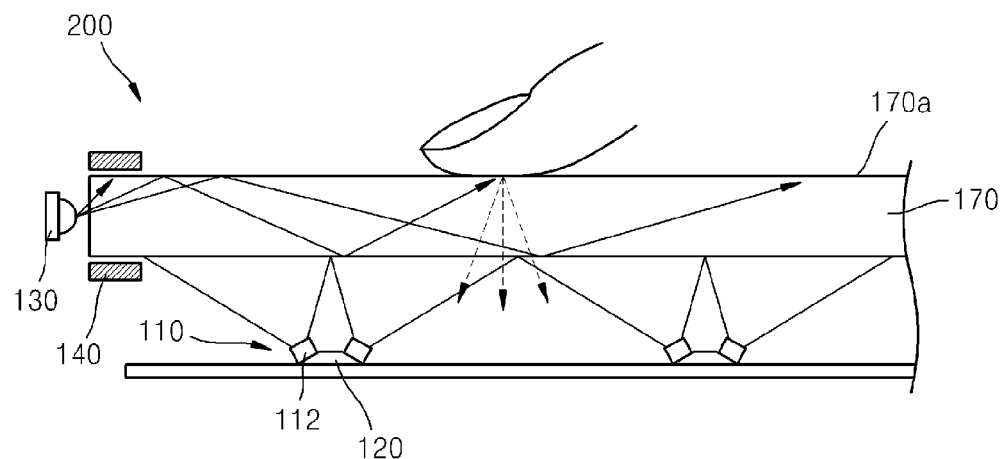
FIG. 5 is a cross-sectional view of a touch panel according to another embodiment.

FIG. 5 is a cross-sectional view of a touch panel 200 according to another embodiment. The embodiment of FIG. 5 is different from the embodiment of FIG. 1 in terms of the arrangement of the infrared ray source 130, and the other configuration of the embodiment of FIG. 5 is substantially the same as that of the embodiment of FIG. 1. Referring to FIG. 5, the infrared ray source 130 is disposed at a side of the touch pad 170 so that the infrared rays incident on the touch pad 170 are totally internally reflected from an inside of the touch pad 170. A shield film 140 may be disposed in a position at which the infrared rays emitted from the infrared ray source 130 may be incident on a surface of the touch pad 170 at an angle less than a critical angle, as illustrated in FIG. 5. The infrared rays incident on the touch pad 170 are totally internally reflected inside the touch pad 170, are scattered at a point at which the user's touch is input, and are sensed by the infrared ray cameras 112.

Figure 6:
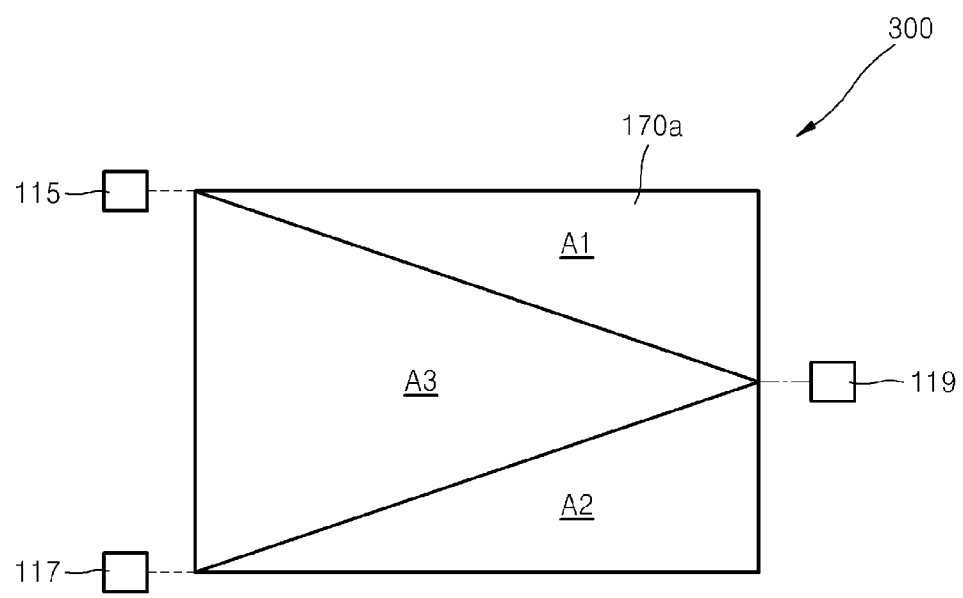
FIG. 6 is a plan view of a touch panel according to another embodiment.

FIG. 6 is a plan view of a touch panel 300 according to another embodiment. The present embodiment represents a structure in which the input surface 170a is covered by first through third infrared ray cameras 115, 117, and 119. Referring to FIG. 6, the infrared ray cameras 115, 117, and 119 are disposed on surfaces different from the input surface 170a, and the infrared ray cameras 115, 117, and 119 are disposed below the input surface 170a and offset from a position directly below the input surface 170a. For example, the first infrared ray camera 115 and the second infrared ray camera 117 may be disposed below a position that corresponds to a position in which the first infrared ray camera 115 and the second infrared ray camera 117 are separated by a distance from both ends of an edge of the input surface 170a along a direction in parallel with the input surface 170a. The third infrared ray camera 119 may be disposed below a position that corresponds to a position in which the third camera 119 separated by a distance from a center of another edge of the input surface 170a parallel to the edge of the input surface 170a along a direction in parallel with the input surface 170a. The first infrared ray camera 115 covers a region indicated by A1, the second infrared ray camera 117 covers a region indicated by A2, and the third infrared ray camera 119 covers a region indicated by A3. Although an infrared ray source is not shown, as illustrated in FIG. 1 or 4, an infrared ray source may be disposed directly below the input surface 170a or at a side of the input surface 170a.

The above-described touch panels 100, 200, and 300 have a structure in which multi-touch is sensed by using a small number of infrared ray cameras. In FIGS. 1, 5, and 6, a display panel that displays an image may be employed as the touch pad 170; in other words, the touch pad 170 may be used as a multi-touch display apparatus. The touch pad 170 may be a self-emissive type display panel or a non-emissive type display panel.

If a non-emissive type display panel is used as the touch pad 170, an additional backlight that provides light for forming an image may be employed. Hereinafter, exemplary embodiments of a multi-touch display apparatus having a backlight will now be described.

Figure 7:
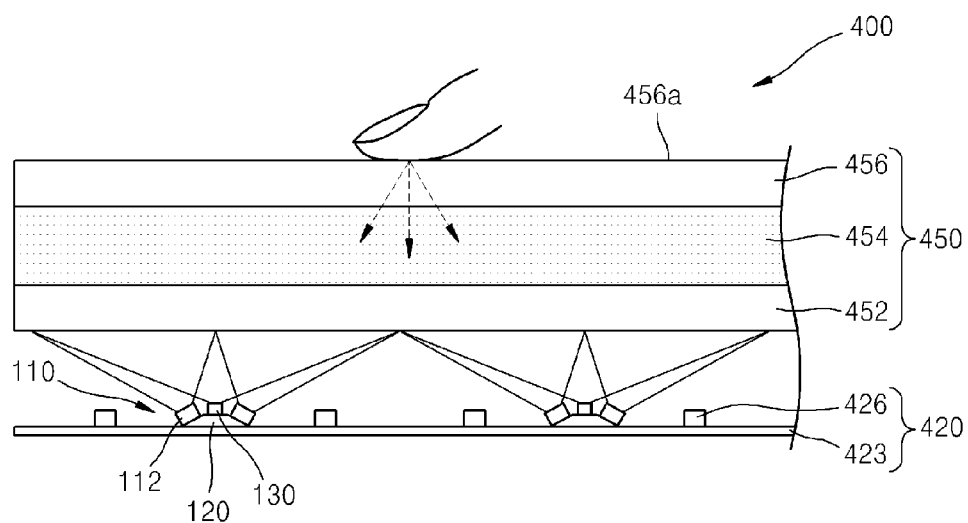
FIG. 7 is a cross-sectional view of a display apparatus according to an embodiment.

FIG. 7 is a cross-sectional view of a display apparatus 400 according to an embodiment. Referring to FIG. 7, the display apparatus 400 according to the present embodiment includes a display panel 450, which forms an image by modulating incident light and includes a display surface 456a on which the image is displayed and to which a user's touch is input through the display surface 456a, at least one infrared ray source 130 that irradiates infrared rays on the display surface 456a, and a camera array 110 including a plurality of infrared ray cameras 112, which are disposed below the display panel 450 and slanted with respect to the display surface 456a.

The display panel 450 is a liquid crystal panel including a liquid crystal layer 454 and two transparent substrates 452 and 456, wherein the liquid crystal layer 454 is interposed between the two transparent substrates 452 and 456. One of the surfaces of the transparent substrate 456 is the display surface 456a. A backlight unit 420 that provides light to the display panel 450 for forming an image may be disposed below the display panel 450.

The backlight unit 420 has a direct type structure and includes a reflection plate 423 and a plurality of light sources 426 disposed on the reflection plate 423. The light sources 426 may be light emitting diodes (LED) or cold cathode fluorescent lamps (CCFL). Although not illustrated, optical films that uniformly mix the light emitted from the light sources 426 and improve brightness may be further included in the backlight unit 420.

The camera array 110 may be constituted by alternately arranging the plurality of infrared ray cameras 112 to be inclined with respect to a plane of the display surface 456a in opposite directions to each other, and is disposed on the reflection plate 423. For example, at least one mount 120 including a surface inclined with respect to the plane of the display surface 456a at an angle θ and a surface inclined with respect to the display surface 456a at an angle −θ may be disposed on the reflection plate 423, and the infrared ray cameras 112 may be disposed on the surfaces of the mount 120. An infrared ray source 130 may be disposed on the reflection plate 423 and may be disposed on a surface of the mount 120 parallel to the display surface 456a formed, for example.

Figure 8:
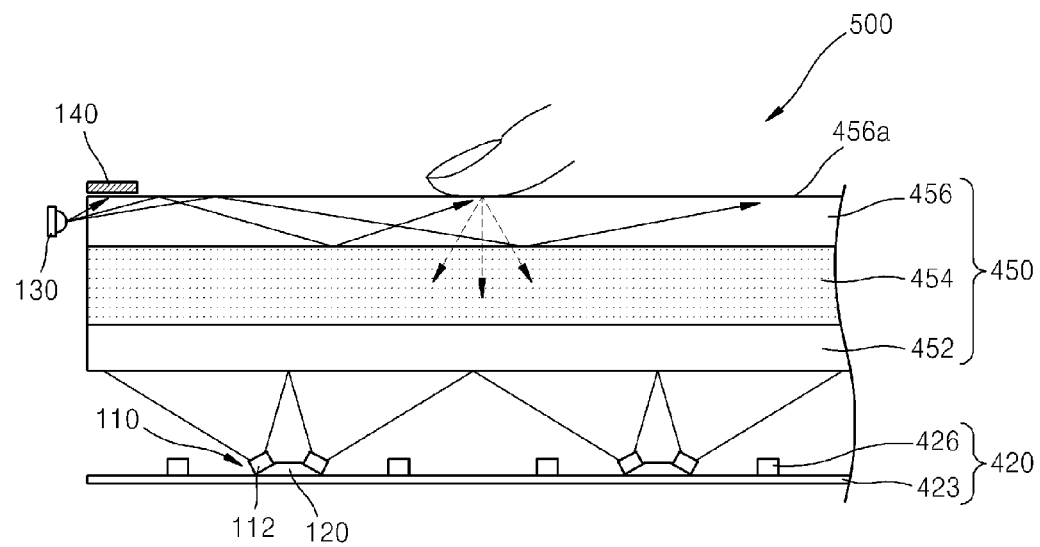
FIG. 8 is a cross-sectional view of a display apparatus according to an exemplary embodiment.

FIG. 8 is a cross-sectional view of a display apparatus 500 according to another embodiment. The present embodiment is different from the embodiment of FIG. 7 in terms of the position of the infrared ray source 130. In other words, the infrared ray source 130 is disposed at a side of the transparent substrate 456 so that the infrared rays incident on the display surface 456a are totally internally reflected inside the transparent substrate 456. In addition, a shield film 140 may be disposed in a position in which the infrared rays emitted from the infrared ray source 130 may be incident on a surface of the transparent substrate 456 at a smaller angle than the critical angle, as illustrated in FIG. 8.

Figure 9:
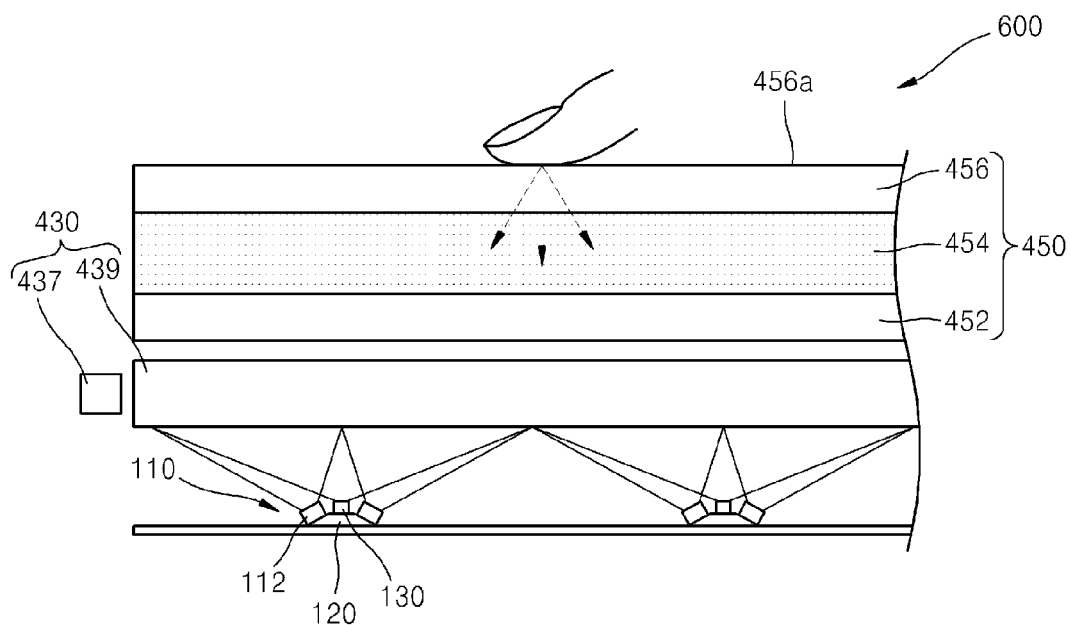
FIG. 9 is a cross-sectional view of a display apparatus according to another embodiment.

FIG. 9 is a cross-sectional view of a display apparatus 600 according to another embodiment. The present embodiment is different from the embodiments of FIGS. 7 and 8 in that the display apparatus 600 of FIG. 9 includes an edge type backlight. In this regard, referring to FIG. 9, a backlight unit 430 includes a light source 437 and a light guide plate 439 and has a structure in which light emitted from the light source 437 is irradiated to the display panel 450 through the light guide plate 439. Although not illustrated in a top surface or a bottom surface of the light guide plate 439, emission patterns are formed, and other optical films may be disposed.

Figure 10:
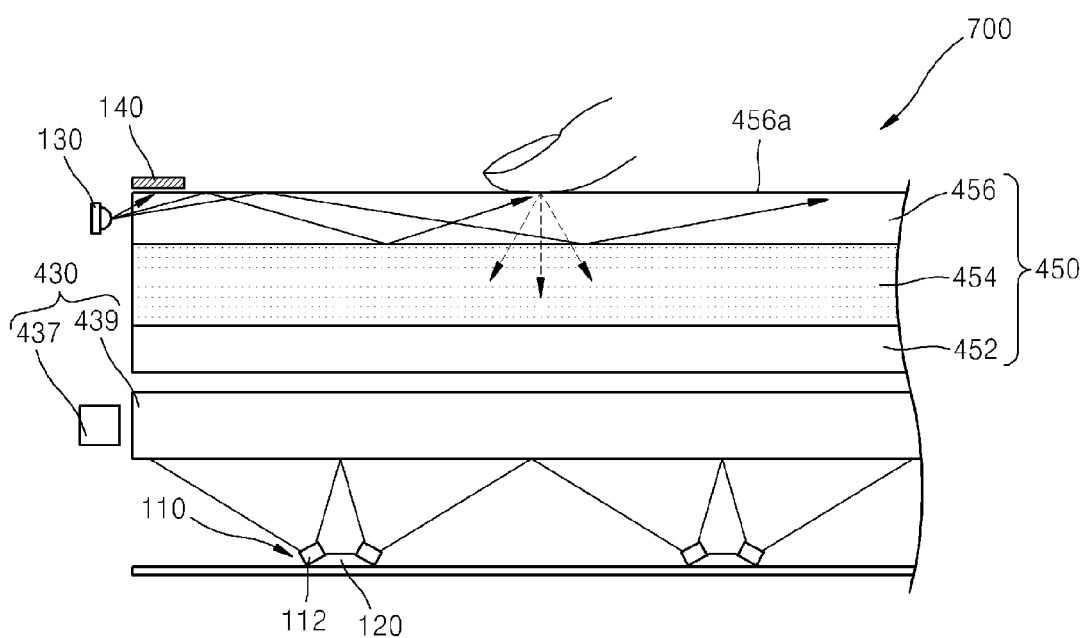
FIG. 10 is a cross-sectional view of a display apparatus according to another embodiment.

FIG. 10 is a cross-sectional view of a display apparatus 700 according to another embodiment. The present embodiment is different from the embodiment of FIG. 9 in terms of the arrangement of the infrared ray source 130.

As described above, in the display apparatuses 400, 500, 600, and 700 respectively illustrated in FIGS. 7, 8, 9, and 10, a user's touch input through the display surface 456a on which an image is displayed, may be multi-sensed by using a plurality of cameras, and the cameras may be inclined with respect to the plane of the display surface 456a so that the display apparatuses 400, 500, 600, and 700 are appropriate for a small-sized or large-sized display by using a small number of cameras.

As described above, in the touch panel according to the one or more of the above embodiments, a user's touch may be sensed by using a plurality of cameras and thus, multi-sensing may be performed. In addition, a wide touch region may be covered by using a small number of cameras without being limited by a viewing angle of the cameras by using a camera array slanted with respect to an input surface to which the user's touch is input.

As described above, in the display apparatus according to the one or more of the above embodiments, the touch panel may be applied to a display panel, and a small-sized or large-sized display in which multi-touch is sensed, may be implemented.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A touch panel comprising:
   a touch pad comprising an input surface to which a user's touch is input;
   at least one infrared ray source which irradiates infrared rays to the touch pad; and
   a camera array comprising a plurality of infrared ray cameras which are disposed below the touch pad and inclined with respect to a plane of the input surface,
   wherein the plurality of infrared ray cameras comprise a first camera which is inclined at a first angle with respect to the plane of the input surface, and a second camera which is inclined at a second angle with respect to the plane of the input surface.

2. The touch panel of claim 1, wherein the first angle and the second angle are equal and opposite to each other.

3. The touch panel of claim 2, wherein the first camera is disposed adjacent to the second camera and the plurality of infrared ray cameras further comprises a third camera which is inclined at the first angle with respect to the plane of the input surface, and the second camera is disposed between the first camera and the third camera.

4. The touch panel of claim 1, further comprising at least one mount which is disposed below the touch pad and comprises a first surface which is inclined with respect to the plane of the input surface at an angle θ and a second surface which is inclined with respect to the plane of the input surface at an angle −θ, wherein a first camera and a second camera of the plurality of infrared ray cameras are disposed on the first surface and the second surface, respectively.

5. The touch panel of claim 4, wherein the at least one mount further comprises a third surface on which the at least one infrared ray source is disposed, and
   wherein the third surface is substantially parallel to the input surface, and the third surface is disposed between the first surface and the second surface.

6. The touch panel of claim 1, wherein the plurality of infrared ray cameras are disposed below the input surface and outside of an outer edge of the input surface.

7. The touch panel of claim 6, wherein the plurality of infrared ray cameras comprise:
   a first infrared ray camera, a second infrared camera, and a third infrared camera;
   wherein the outer edge of the input surface comprises a first side edge and a second side edge which is opposite the first side edge; and
   wherein the first infrared camera is disposed at an upper portion of the first side edge, the second infrared ray camera is disposed at a lower portion of the first side edge, and the third infrared camera is disposed at a center portion of the second side edge.

8. The touch panel of claim 1, wherein the at least one infrared ray source is disposed below the touch pad.

9. The touch panel of claim 1, wherein the at least one infrared ray source is disposed at a side of the touch pad so that the infrared rays incident on the touch pad are totally internally reflected inside the touch pad.

10. The touch panel of claim 9, further comprising a shield film disposed on a portion of the input surface on which infrared rays are incident at an angle that is less than a critical angle.

11. The touch panel of claim 1, wherein the touch pad comprises a display panel which forms an image by modulating incident light, and the display panel comprises a display surface on which the image is displayed and the display surface corresponds to the input surface.

12. A display apparatus comprising:
    a display panel which forms an image by modulating incident light, the display panel comprising a display surface on which the image is displayed, and the display surface being configured as an input surface to which a user's touch is input;
    at least one infrared ray source which irradiates infrared rays to the display surface; and
    a camera array comprising a plurality of infrared ray cameras which are disposed below the display panel and inclined with respect to a plane of the input surface,
    wherein the plurality of infrared ray cameras comprises a first camera which is inclined at a first angle with respect to the plane of the input surface and a second camera which is inclined at a second angle with respect to the plane of the input surface.

13. The display apparatus of claim 12, further comprising at least one mount disposed below the display panel, the mount comprising a first surface which is inclined with respect to the plane of the display surface at an angle θ and a second surface which is inclined with respect to the plane of the display surface at an angle −θ, wherein a first camera and a second camera of the plurality of infrared ray cameras are disposed on the first surface and the second surface, respectively.

14. The display apparatus of claim 13, wherein the at least one mount further comprises a third surface on which the at least one infrared ray source is disposed, and
    wherein the third surface is substantially parallel to the display surface and the third surface is disposed between the first surface and the second surface.

15. The display apparatus of claim 12, wherein the plurality of infrared ray cameras are disposed below the display surface and outside of an outer edge of the display surface.

16. The display apparatus of claim 15, wherein the plurality of infrared ray cameras comprise:
    a first infrared ray camera, a second infrared camera, and a third infrared camera;
    wherein the outer edge of the display surface comprises a first side edge and a second side edge that is opposite the first side edge; and
    wherein the first infrared camera is disposed at an upper portion of the first side edge, the second infrared ray camera is disposed at a lower portion of the first side edge, and the third infrared camera is disposed at a center portion of the second side edge.

17. The display apparatus of claim 12, wherein the display panel comprises a liquid crystal panel,
the display apparatus further comprising a backlight unit which provides light to the liquid crystal panel.

18. The display apparatus of claim 17, wherein a transparent substrate which is included in the liquid crystal panel is the display surface, and
wherein the at least one infrared ray source is disposed at a side of the transparent substrate so that infrared rays incident on the display surface are totally internally reflected inside the transparent substrate.

19. The display apparatus of claim 17, wherein the backlight unit comprises a reflection plate and a plurality of light sources disposed on the reflection plate, and
wherein the camera array comprising the plurality of infrared ray cameras is disposed on the reflection plate.

20. The display apparatus of claim 19, wherein the at least one infrared ray source is disposed on the reflection plate.

21. The display apparatus of claim 17, wherein the backlight unit comprises a light source and a light guide plate, and wherein the camera array is disposed below the light guide plate.

22. The display apparatus of claim 12, wherein the first angle and the second angle are equal and opposite to each other.

23. The display apparatus of claim 22, wherein the first camera is disposed adjacent to the second camera and the plurality of infrared ray cameras further comprises a third camera which is inclined at the first angle with respect to the plane of the input surface, and the second camera is disposed between the first camera and the third camera.

* * * * *